(12) United States Patent
Xiao et al.

(10) Patent No.: US 7,790,322 B2
(45) Date of Patent: *Sep. 7, 2010

(54) ADDITIVE MIXTURE FOR ELECTROLYTE OF LITHIUM ION SECONDARY BATTERY AND ELECTROLYTE OF LITHIUM ION SECONDARY BATTERY COMPRISING THE SAME

(75) Inventors: Feng Xiao, Shenzhen (CN); Mingxia Wang, Shenzhen (CN); Guishu Zhou, Shenzhen (CN); Huaying You, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 12/090,728

(22) PCT Filed: Oct. 17, 2006

(86) PCT No.: PCT/CN2006/002727

§ 371 (c)(1),
(2), (4) Date: Jul. 29, 2008

(87) PCT Pub. No.: WO2007/045162

PCT Pub. Date: Apr. 26, 2007

(65) Prior Publication Data

US 2009/0042103 A1    Feb. 12, 2009

(30) Foreign Application Priority Data

Oct. 18, 2005    (CN) .................. 2005 1 0100488

(51) Int. Cl.
*H01M 6/18* (2006.01)
(52) U.S. Cl. .................. 429/307; 429/200; 429/326; 429/338; 429/340; 429/341; 429/342; 429/330; 429/331; 429/332
(58) Field of Classification Search .............. 429/307, 429/200, 326, 338, 340, 341, 342, 330, 331, 429/332
See application file for complete search history.

(56) References Cited

U.S. PATENT DOCUMENTS

2006/0147808 A1 *   7/2006   Xiao et al. .................. 429/200

FOREIGN PATENT DOCUMENTS

| CN | 1430306 A    | 7/2003  |
|----|--------------|---------|
| CN | 1475038 A    | 2/2004  |
| JP | 2002260725 A | 9/2002  |
| JP | 2002313415 A1| 10/2002 |
| JP | 2003308875 A | 10/2003 |

\* cited by examiner

*Primary Examiner*—Laura S Weiner
(74) *Attorney, Agent, or Firm*—Volpe and Koenig, P.C.

(57) ABSTRACT

Disclosed herewith are an additive mixture for the electrolyte of lithium ion secondary batteries and electrolyte of lithium ion secondary batteries comprising the said additive mixture. The additive mixture comprises biphenyl based compound 0.5-95.4 wt %, cyclohexyl benzene based compound 0.1-93.8 wt %, vinylene carbonate 0.4-93.2 wt %, t-alkyl benzene based compound 0.5-96.5 wt %, and phenyl vinyl sulfone 0.5-95.8% based on total weight of the additive mixture.

6 Claims, 2 Drawing Sheets

ADDITIVE MIXTURE FOR ELECTROLYTE OF LITHIUM ION SECONDARY BATTERY AND ELECTROLYTE OF LITHIUM ION SECONDARY BATTERY COMPRISING THE SAME

FIELD OF THE INVENTION

The present invention relates to an additive mixture for electrolyte of lithium ion secondary battery and electrolyte of lithium ion secondary battery comprising the same.

BACKGROUND OF THE INVENTION

Owning to advantages of high energy density, no memory effect, high working voltage, high output power, low self-discharge, long cycle life, high load capability, and no environment pollution, rechargeable lithium ion batteries are widely used in portable electronic products such as notebook computer, communication tools such as cell phone, military products, equipment for aerospace, navigation, and aviation applications, and transportation tools such as electric vehicles and motorcycles. Along with increasing demand for lithium ion batteries, the technical requirement for the batteries strengthens, particularly for battery safety performance. Although safety performance of the available lithium ion batteries has been improved dramatically, accidents like smoking, fire, and explosion may occur in case of improper use, such as overcharge and short circuit. The method for improving battery safety performance mainly comprises adding circuit protection and improving electrolyte safety performance. CN 1632983A discloses a electrolyte of lithium ion secondary battery with safety performance, which is prepared by adding aromatic compound and cyclohexyl benzene into common electrolyte of lithium ion secondary battery, wherein the aromatic compound can be phenyl ether, biphenyl, biphenyl ester, halogenated phenyl ether, halogenated biphenyl, or terphenyl, the addition amounts of the aromatic compound and cyclohexyl benzene are respectively 0.5-5 wt % and 1-10 wt % based on the weight of the electrolyte of lithium ion secondary battery. The battery with aluminum casing, which adopts electrolyte made from methoxybenzene 3 wt % and cyclohexylbenzene 2 wt %, generates no smoking, no fire, and no explosion when subjected to overcharge test at the condition of 85□, 3 C, and 10V. JP 2004214139 discloses that heat generation can be reduced by adding cyclohexylbenzene or derivative thereof (having 5-9 carbon atoms on ring being substituted) so as to improve safety. CN 1385918A discloses a electrolyte of lithium ion secondary battery, which is prepared by adding high-activity monomer of polymer as additive into prior electrolyte of lithium ion secondary battery, wherein the high-activity monomer of polymer can be one or more of pyridine based compound, biphenyl based compound, and carbazole based compound. The aforementioned electrolytes can improve overcharge protection of 4.4V battery system.

Although the aforementioned electrolytes can improve safety performance of lithium ion secondary batteries to certain extent, they also cause degradation of cycle performance and low temperature performance of the batteries at the same time.

SUMMARY OF THE INVENTION

One object of the present invention is to overcome disadvantages in prior art that the conventional additive for electrolyte of lithium ion secondary battery degrades cycle performance and low temperature performance of the battery when improving battery safety performance, and to provide an additive mixture for electrolyte of lithium ion secondary battery which can effectively enhance cycle performance and low temperature performance of the battery while improving battery safety performance. Another object of the present invention is to provide an electrolyte of lithium ion secondary battery comprising the aforementioned additive mixture provided by the present invention.

The present invention provides an additive mixture for electrolyte of lithium ion secondary battery, wherein the additive mixture comprises biphenyl based compound 0.5-95.4 wt %, cyclohexylbenzene based compound 0.1-93.8 wt %, vinylene carbonate 0.4-93.2 wt %, t-alkyl benzene based compound 0.5-96.5 wt %, and phenyl vinyl sulfone 0.5-95.8% based on the total weight of the additive mixture.

The electrolyte of lithium ion secondary battery provided by the present invention comprises an organic solvent, a lithium salt and an additive, wherein the said additive is the additive mixture provided by the present invention.

The major advantages of the additive mixture for electrolyte of lithium ion secondary battery and the lithium ion secondary battery comprising the same according to the present invention are that the lithium ion secondary battery using the electrolyte comprising the additive mixture provided by the present invention has desirable overcharge performance, low temperature performance, and cycle performance, good safety and reliability, and no explosion and fire under overcharge condition; can bear overcharge at the condition of 18.5V and 1 C up to 150 min; has overcharge maximum temperature as low as 120□, high discharge capacity at −10° C. or −20° C., low cyclic swelling, long cycle life, high capacity retention rate, high medium voltage, and low ending internal resistance, which exhibits significantly improved low temperature performance and cycle performance compared with those of the batteries using the prior additives.

DETAILED DESCRIPTION OF THE PREFERRED EMBODIMENTS

Figure 1:
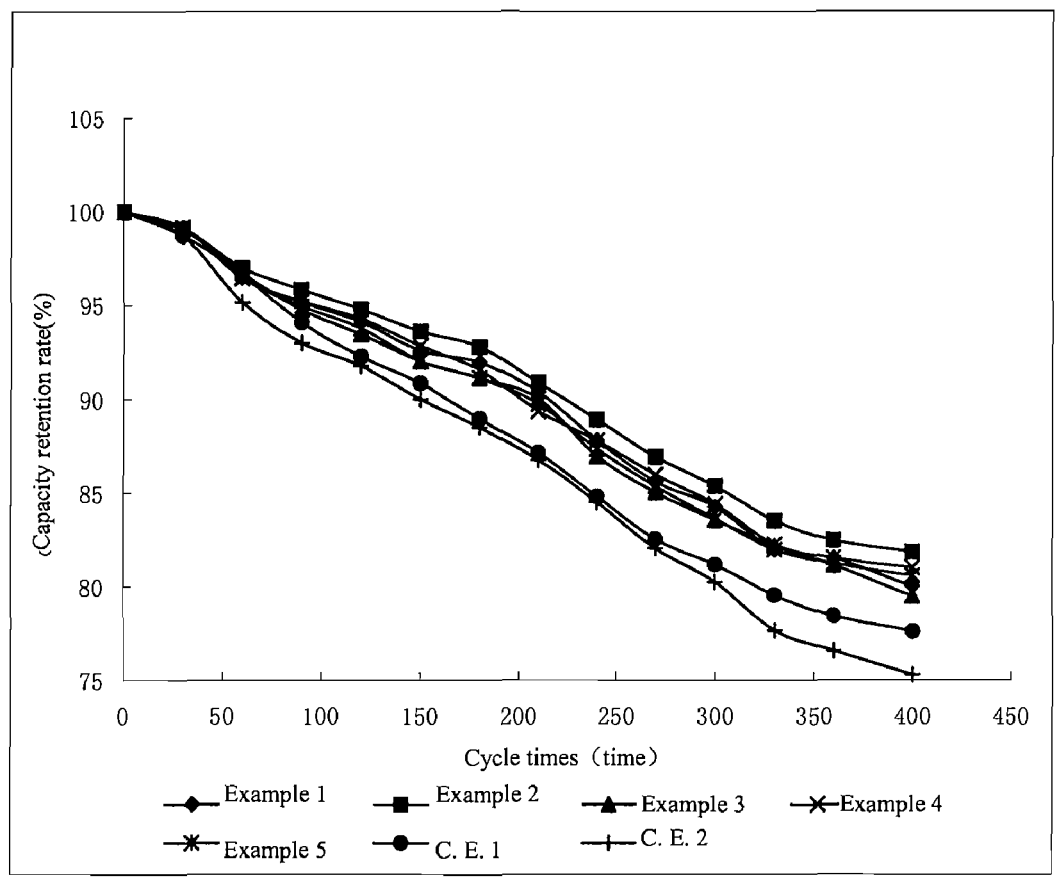
FIG. 1 is the curve shows the relationship between the capacity retention rate (%) and cycle times (times) for lithium ion secondary batteries prepared by examples 1-5 of the present invention and comparative examples 1-2.

According to the present invention, the biphenyl based compound can be various compounds comprising biphenyl group, such as one or more selected from biphenyl, 2-cyclohexyl biphenyl, 3-cyclohexyl biphenyl, 4-cyclohexyl biphenyl, terphenyl, 4-diphenyl cyclohexylamine, and derivatives thereof. As biphenyl and/or 3-cyclohexyl biphenyl can be easily obtained and can further improve lithium ion secondary battery performance, biphenyl and/or 3-cyclohexyl biphenyl are preferably used as the biphenyl based compound. The content of the biphenyl based compound in the additive mixture can be 0.5-95.4 wt % based on the total weight of the additive mixture, preferably 3-60 wt %. The said cyclohexyl benzene based compound can be various compounds comprising cyclohexyl phenyl group, such as one or more selected from 1,3-dicyclohexyl benzene, cyclohexyl benzene, and derivatives thereof. As cyclohexyl benzene can be easily obtained and can further improve lithium ion secondary battery performance, cyclohexyl benzene is preferably used as cyclohexyl benzene based compound. The content of the cyclohexyl benzene based compound in the additive mixture can be 0.1-93.8 wt % base on the total weight of the additive mixture, preferably 5-50 wt %. The said t-alkyl benzene based compound refers to one or more products resulted from substitution of one or more hydrogen atoms on benzene ring by tert-carbon atom-containing chain-like alkyl group, i.e. mono or multi-substituted tert-carbon atom-containing chain-like alkyl benzene, such as one or more selected from t-butyl benzene and t-pentyl benzene. The t-carbon atom refers to alkyl carbon atom directly bonded with one ring-forming carbon atom of the benzene ring. The alkyl can be t-alkyl having 4-10 carbon atoms, preferably having 4-6 carbon atoms. The t-alkyl benzene can be preferably t-butyl benzene and/or t-pentyl benzene. The content of the t-alkyl benzene based compound in the additive mixture can be 0.5-96.5 wt % based on the total weight of the additive mixture, preferably 10-60 wt %. Based on the total weight of the additive mixture, the content of vinylene carbonate in the additive mixture can be 0.4-93.2 wt %, preferably 5-40 wt %; and the content of phenyl vinyl sulfone can be 0.5-95.8 wt %, preferably 2-40 wt %. The additive mixture in the present invention can be obtained by uniformly mixing the aforementioned components. According to the present invention, the present invention mainly relates to improvement of the additive in the electrolyte, and there is no special restriction on other components of the electrolyte, such as organic solvent, lithium salt, and contents thereof. The organic solvent in the electrolyte of lithium ion secondary battery can be various conventional organic solvents for electrolyte of lithium ion secondary battery, such as one or more selected from dimethyl carbonate (DMC), diethyl carbonate (DEC), ethylene carbonate (EC), propylene carbonate (PC), ethyl methyl carbonate (EMC), butylene carbonate (BC), methyl ethylene carbonate (MEC), 2-methyl tetrahydrofuran, 1,2-butylene carbonate, methyl propionate, methyl formate, and tetrafuran. The lithium salt can be various conventional lithium salts for lithium ion secondary batteries, such as one or more selected from $LiPF_6$, $LiBF_6$, $LiAsF_6$, $LiClO_4$, $LiCF_3CO_2$, $Li(CF_3CO_2)_2N$, $LiCF_3SO_3$, $Li(CF_3SO_2)_3$ and $Li(CF_3SO_2)_2N$.

Although the object of the present invention can be achieved by adding small amount of the additive mixture provided by the present invention, preferably, based on the total weight of the electrolyte, the content of the additive mixture can be 1-30 wt %, preferably 2-25 wt %; the content of the lithium salt can be 5-15 wt %, preferably 11-13 wt %; the content of the organic solvent can be 55-87 wt %, preferably 65-85 wt %.

The electrolyte of lithium ion secondary battery provided by the present invention can be obtained by uniformly mixing the organic solvent, the lithium slat, and the additive mixture. There is no special restriction on adding sequence and manner of the organic solvent, the lithium salt, and the additive mixture, for example, the organic solvent and the additive mixture can be mixed firstly, and then further mixed with the lithium salt; or the organic solvent and the lithium salt are mixed firstly, and then further mixed with the additive mixture; or the lithium salt, the organic solvent, and the additive mixture are simultaneously mixed to obtain uniform electrolyte. For speeding up dissolving of the lithium salt and improving preparation efficiency of the electrolyte, the organic solvent, lithium salt and additive mixture are preferably heated for 20-30 min at 50-70☐ under sealed condition after being mixed, so as to rapidly give the electrolyte of lithium ion secondary battery according to the present invention.

The embodiments below will describe the present invention in further detail, but these should not be construed as limitations on the scope of the invention. Through these embodiments, those skilled in the art should better understand the advantages of the additive mixture provided by the present invention.

EXAMPLE 1

Preparation of the additive mixture: uniformly mixing 3-cyclohexyl biphenyl 3.0 weight parts, cyclohexyl benzene 50.0 weight parts, vinylene carbonate 40 weight parts, t-pentyl benzene 5.0 weight parts, and phenyl vinyl sulfone 2.0 weight parts to give the additive mixture A1 for electrolyte of lithium ion secondary battery according to the present invention.

Preparation of the electrolyte: adding $LiPF_6$ 23.0 weight parts as electrolyte and the aforementioned additive mixture A1 7.0 weight parts to the mixture obtained by mixing ethylene carbonate 50.0 weight parts, ethyl methyl carbonate 50.0 weight parts, and dimethyl carbonate 50.0 weight parts, and sealing followed by fully dissolving solid or turbidity therein by heating at 50☐ for 20 min to give the electrolyte of lithium ion secondary battery B1 consisted of the additive mixture 3.9 wt %, organic solvent 83.3 wt %, and lithium salt 12.8 wt %.

EXAMPLE 2

Preparation of the additive mixture: uniformly mixing 3-cyclohexyl biphenyl 30.0 weight parts, cyclohexyl benzene 5.0 weight parts, vinylene carbonate 10.0 weight parts, t-butyl benzene 15.0 weight parts, and phenyl vinyl sulfone 40.0 weight parts to give the additive mixture A2 for electrolyte of lithium ion secondary battery according to the present invention.

Preparation of the electrolyte: adding $LiPF_6$ 27 weight parts as electrolyte and the aforementioned additive mixture A2 33 weight parts to the mixture obtained by mixing ethylene carbonate 50.0 weight parts, ethyl methyl carbonate 50.0 weight parts, and dimethyl carbonate 50.0 weight parts, and sealing followed by fully dissolving solid or turbidity therein by heating at 60☐ to give the electrolyte of lithium ion secondary battery B2 consisted of the additive mixture 15.7 wt %, organic solvent 71.4 wt %, and lithium salt 12.9 wt %.

EXAMPLE 3

Preparation of the additive mixture: uniformly mixing biphenyl 20.0 weight parts, cyclohexyl benzene 30.0 weight parts, vinylene carbonate 15.0 weight parts, t-butyl benzene 20.0 weight parts, and phenyl vinyl sulfone 12.0 weight parts to give the additive mixture A3 for electrolyte of lithium ion secondary battery according to the present invention.

Preparation of the electrolyte: adding $LiPF_6$ 25.0 weight parts as electrolyte and the aforementioned additive mixture A3 20.0 weight parts to the mixture obtained by mixing ethylene carbonate 50.0 weight parts, ethyl methyl carbonate 50.0 weight parts, and dimethyl carbonate 50.0 weight parts, and sealing followed by fully dissolving solid or turbidity therein by heating at 70☐ to give the electrolyte of lithium ion secondary battery B3 consisted of the additive mixture 10.3 wt %, organic solvent 76.9 wt %, and lithium salt 12.8 wt %.

EXAMPLE 4

Preparation of the additive mixture: uniformly mixing terphenyl 25.0 weight parts, 1,3-bicyclohexyl benzene 25.0 weight parts, vinylene carbonate 12.0 weight parts, t-pentyl benzene 20.0 weight parts, and phenyl vinyl sulfone 18.0 weight parts to give the additive mixture A4 for electrolyte of lithium ion secondary battery according to the present invention.

Preparation of the electrolyte: adding $LiPF_6$ 26.0 weight parts as electrolyte and the aforementioned additive mixture A4 24.0 weight parts to the mixture obtained by mixing ethylene carbonate 50.0 weight parts, ethyl methyl carbonate 50.0 weight parts, and dimethyl carbonate 50.0 weight parts, and sealing followed by fully dissolving solid or turbidity therein by heating at 70☐ to give the electrolyte of lithium ion secondary battery B4 consisted of the additive mixture 12.0 wt %, organic solvent 75.0 wt %, and lithium salt 13.0 wt %.

EXAMPLE 5

Preparation of the additive mixture: uniformly mixing terphenyl 30.0 weight parts, 1,3-bicyclohexyl benzene 20.0 weight parts, vinylene carbonate 25.0 weight parts, t-pentyl benzene 20.0 weight parts, and phenyl vinyl sulfone 18.0 weight parts to give the additive mixture A5 for electrolyte of lithium ion secondary battery according to the present invention.

Preparation of the electrolyte: adding $LiPF_6$ 25.0 weight parts as electrolyte and the aforementioned additive mixture A5 21.0 weight parts to the mixture obtained by mixing ethylene carbonate 50.0 weight parts, ethyl methyl carbonate 50.0 weight parts, and dimethyl carbonate 50.0 weight parts, and sealing followed by fully dissolving solid or turbidity therein by heating at 70☐ to give the electrolyte of lithium ion secondary battery B5 consisted of the additive mixture 10.7 wt %, organic solvent 76.5 wt %, and lithium salt 12.8 wt %.

EXAMPLE 6

Preparation of the additive mixture: uniformly mixing biphenyl 40.0 weight parts, cyclohexyl benzene 10.0 weight parts, vinylene carbonate 5.0 weight parts, t-butyl benzene 25.0 weight parts, and phenyl vinyl sulfone 20.0 weight parts to give the additive mixture A6 for electrolyte of lithium ion secondary battery according to the present invention.

Preparation of the electrolyte: adding $LiPF_6$ 26.5 weight parts as electrolyte and the aforementioned additive mixture A6 30.0 weight parts to the mixture obtained by mixing ethylene carbonate 50.0 weight parts, ethyl methyl carbonate 50.0 weight parts, and dimethyl carbonate 50.0 weight parts, and sealing followed by fully dissolving solid or turbidity therein by heating at 70☐ to give the electrolyte of lithium ion secondary battery B6 consisted of the additive mixture 14.5 wt %, organic solvent 72.7 wt %, and lithium salt 12.8 wt %.

EXAMPLE 7

Preparation of the additive mixture: uniformly mixing biphenyl 10.0 weight parts, cyclohexyl benzene 30.0 weight parts, vinylene carbonate 10.0 weight parts, t-pentyl benzene 45.0 weight parts, and phenyl vinyl sulfone 5.0 weight parts to give the additive mixture A7 for electrolyte of lithium ion secondary battery according to the present invention.

Preparation of the electrolyte: adding $LiPF_6$ 27.4 weight parts as electrolyte and the aforementioned additive mixture A7 37.0 weight parts to the mixture obtained by mixing ethylene carbonate 50.0 weight parts, ethyl methyl carbonate 50.0 weight parts, and dimethyl carbonate 50.0 weight parts, and sealing followed by fully dissolving solid or turbidity therein by heating at 50☐ to give the electrolyte of lithium ion secondary battery B7 consisted of the additive mixture 17.2 wt %, organic solvent 70.0 wt %, and lithium salt 12.8 wt %.

EXAMPLE 8

Preparation of the additive mixture: uniformly mixing biphenyl 20.0 weight parts, cyclohexyl benzene 40.0 weight parts, vinylene carbonate 15.0 weight parts, t-butyl benzene 15.0 weight parts, and phenyl vinyl sulfone 10.0 weight parts to give the additive mixture A8 for electrolyte of lithium ion secondary battery according to the present invention.

Preparation of the electrolyte: adding $LiPF_6$ 26.0 weight parts as electrolyte and the aforementioned additive mixture A8 27.0 weight parts to the mixture obtained by mixing ethylene carbonate 50.0 weight parts, ethyl methyl carbonate 50.0 weight parts, and dimethyl carbonate 50.0 weight parts, and sealing followed by fully dissolving solid or turbidity therein by heating at 70☐ to give the electrolyte of lithium ion secondary battery B8 consisted of the additive mixture 13.3 wt %, organic solvent 73.9 wt %, and lithium salt 12.8 wt %.

EXAMPLE 9

Preparation of the additive mixture: uniformly mixing biphenyl 15.0 weight parts, cyclohexyl benzene 35.0 weight parts, vinylene carbonate 20.0 weight parts, t-butyl benzene 15.0 weight parts, and phenyl vinyl sulfone 15.0 weight parts to give the additive mixture A9 for electrolyte of lithium ion secondary battery according to the present invention.

Preparation of the electrolyte: adding $LiPF_6$ 26.5 weight parts as electrolyte and the aforementioned additive mixture A9 30 weight parts to the mixture obtained by mixing ethylene carbonate 50.0 weight parts, ethyl methyl carbonate 50.0 weight parts, and dimethyl carbonate 50.0 weight parts, and sealing followed by fully dissolving solid or turbidity therein by heating at 50☐ to give the electrolyte of lithium ion secondary battery B9 consisted of the additive mixture 14.5 wt %, organic solvent 72.7 wt %, and lithium salt 12.8 wt %.

Comparative Example 1

Preparation of the electrolyte: adding $LiPF_6$ 23.0 weight parts as electrolyte to the mixture obtained by mixing ethylene carbonate 50.0 weight parts, ethyl methyl carbonate 50.0 weight parts, and dimethyl carbonate 50.0 weight parts, and sealing followed by dissolving solid or turbidity therein by heating at 50☐ to give the electrolyte of lithium ion secondary battery CB 1.

Comparative Example 2

Preparation of the electrolyte: adding $LiPF_6$ 24.2 weight parts as electrolyte, terphenyl 3.5 weight parts, and cyclohexyl benzene 1.8 weight parts to the mixture obtained by mixing ethylene carbonate 50.0 weight parts, ethyl methyl carbonate 50.0 weight parts, and dimethyl carbonate 50.0 weight parts, and sealing followed by dissolving solid or turbidity therein by heating at 50□ to give the electrolyte of lithium ion secondary battery CB2 which has identical composition as that of the sample prepared by in example 2D in CN 1632983 and is consisted of additive mixture 3 wt %, organic solvent 83.6 wt %, and lithium salt 13.5 wt %.

Performance Test

The electrolytes B1-B9 and CB1-CB2 prepared according to Examples 1-9 and Comparative Examples 1-2 are respectively injected into battery cases, and sealed to give 453450A type lithium ion secondary batteries D1-D9 and CD1-CD2. The obtained lithium ion secondary batteries are tested according to the methods as below.

(1) Over charge performance test is carried out under condition of temperature of 16-30□ and relative humidity of 20-85%. The test method comprises cleaning battery surface, adopting BS-9300(R) secondary battery performance tester to charge batteries to be tested at 200 mA (0.2 C) to 3.8V, standing for 5 min, and discharging at 1000 mA to 3.0V; respectively regulating output current and output voltage of a constant-current constant-voltage source to current value of 1000 mA (1 C) and 12V or 18.5V required by the test; fixing the thermal couple probe of a thermometer at middle part of the battery lateral face via high-temperature tape, uniformly wrapping the battery surface with a layer of 12 mm-thick loose asbestos, compacting the asbestos to 6-7 mm thick during wrapping, shutting off power of the constant-current constant-voltage source, connecting the battery to be tested, universal instrument, and the constant-current constant-voltage source via wire, and placing them in a safety cabinet; switching on the power of the constant-current constant-voltage source, simultaneously timing, overcharging the battery, and measuring the voltage changes by using the universal instrument; recording changes of temperature, voltage, and current of the battery while observing whether the battery has abnormal phenomena of leakage, cracking, smoking, explosion, and fire; and recording the time when abnormal phenomena occurs and the maximum temperature of the battery surface at that time. The test is stopped when any of the following conditions is satisfied: the battery surface temperature reaches 200° C. or higher; the battery is exploded or on fire; the overcharge current is reduced to 50 mA or lower; the battery voltage reaches specified voltage and the battery surface temperature decreases to 35 C or lower.

The test result is shown in Table 1, in which $t_{max}$ and $T_{max}$ respectively represent longest time and maximum temperature for overcharge, and the units are respectively minute and □.

TABLE 1

| | | 1 C, 12 V overcharge | | | 1 C, 18.5 V overcharge | | |
|---|---|---|---|---|---|---|---|
| Electrolyte | Battery | phenomena | $t_{max}$(min) | $T_{max}$(° C.) | phenomena | $t_{max}$(min) | $T_{max}$(° C.) |
| B1 | D1 | No explosion and no fire | 120 | 155 | No explosion and no fire | 100 | 158 |
| B2 | D2 | No explosion and no fire | 150 | 146 | No explosion and no fire | 150 | 139 |
| B3 | D3 | No explosion and no fire | 150 | 119 | No explosion and no fire | 150 | 130 |
| B4 | D4 | No explosion and no fire | 150 | 118 | No explosion and no fire | 150 | 128 |
| B5 | D5 | No explosion and no fire | 150 | 111 | No explosion and no fire | 150 | 127 |
| B6 | D6 | No explosion and no fire | 150 | 109 | No explosion and no fire | 150 | 122 |
| B7 | D7 | No explosion and no fire | 150 | 154 | No explosion and no fire | 150 | 156 |
| B8 | D8 | No explosion and no fire | 150 | 118 | No explosion and no fire | 150 | 128 |
| B9 | D9 | No explosion and no fire | 150 | 116 | No explosion and no fire | 150 | 118 |
| CB1 | CD1 | explosion | 91 | 328 | explosion | 96 | 338 |
| CB2 | CD2 | No explosion and no fire | 150 | 132 | No explosion and no fire | 120 | 132 |

(2) −10° C. low temperature performance test comprises constant-current constant-voltage charging the battery at 1 C to 4.2V, then discharging at IC to 3.0V, wherein the discharging capacity is the initial capacity; constant-voltage constant-current charging at 1 C to 4.2V, then discharging at IC at −10° C., respectively recording capacity, medium voltage, and ending internal resistance when the battery is discharged to 3.1V, 3.0V, and 2.75V, and calculating capacity retention rates at each discharging voltage according to the equation as below:

capacity retention rate at −10° C.=discharging capacity at −10° C./initial capacity at −10° C. The result is shown in Table 2.

TABLE 2

| | | −10° C., 1 C discharging | | | | |
|---|---|---|---|---|---|---|
| Electrolyte | Battery | 3.1 V capacity retention rate (%) | 3.0 V capacity retention rate (%)) | 2.75 V capacity retention rate (%) | Medium voltage (V) | Ending internal resistance (Ω) |
| B1 | D1 | 43.8 | 47.5 | 49.8 | 3.316 | 48.5 |
| B2 | D2 | 47.9 | 49.8 | 53.8 | 3.317 | 41.9 |
| B3 | D3 | 43.9 | 47.7 | 49.9 | 3.315 | 47.5 |
| B4 | D4 | 42.8 | 47.3 | 48.5 | 3.315 | 49.5 |
| B5 | D5 | 40.9 | 44.1 | 46.8 | 3.315 | 50.1 |
| B6 | D6 | 41.2 | 44.3 | 46.9 | 3.314 | 50.9 |
| B7 | D7 | 44.9 | 46.2 | 48.6 | 3.316 | 50.8 |
| B8 | D8 | 44.2 | 48.2 | 50.3 | 3.316 | 48.2 |
| B9 | D9 | 42.6 | 44.7 | 48.2 | 3.318 | 50.1 |
| CB1 | CD1 | 33.8 | 38.2 | 43.9 | 3.309 | 53.1 |
| CB2 | CD2 | 30.7 | 34.2 | 40.6 | 3.302 | 54.5 |

(3) −20° C. low temperature performance test comprises constant-current constant-voltage charging the battery at IC to 4.2V, discharging at IC to 3.0V, wherein the discharging capacity is the initial capacity; constant-voltage constant-current charging at 1 C to 4.2V, discharging at 1 C at −20° C., respectively recording capacity, medium voltage, and ending internal resistance when the battery is discharged to 3.1V, 3.0V, and 2.75V, and calculating capacity retention rates at each discharging voltage according to the equation as below: Capacity retention rate at −20° C.=discharging capacity at −20° C./initial capacity at −20° C. The result is shown in Table 3.

TABLE 3

| | | −20° C., 1 C discharging | | | | |
|---|---|---|---|---|---|---|
| Electrolyte | Battery | 3.1 V capacity retention rate (%) | 3.0 V capacity retention rate (%)) | 2.75 V capacity retention rate (%) | Medium voltage (V) | Ending internal resistance (Ω) |
| B1 | D1 | 28.8 | 31.7 | 40.9 | 3.108 | 53.9 |
| B2 | D2 | 32.4 | 35.7 | 42.9 | 3.118 | 54.6 |
| B3 | D3 | 31.9 | 36.4 | 43.8 | 3.113 | 54.8 |
| B4 | D4 | 30.7 | 33.7 | 41.6 | 3.108 | 53.5 |
| B5 | D5 | 28.7 | 31.6 | 40.9 | 3.107 | 53.9 |
| B6 | D6 | 29.7 | 31.7 | 36.5 | 3.105 | 56.8 |
| B7 | D7 | 28.9 | 29.1 | 41.2 | 3.104 | 56.8 |
| B8 | D8 | 32.2 | 36.8 | 44.0 | 3.113 | 55.6 |
| B9 | D9 | 28.6 | 29.6 | 40.8 | 3.107 | 56.1 |
| CB1 | CD1 | 22.6 | 28.4 | 39.0 | 3.100 | 57.8 |
| CB2 | CD2 | 20.2 | 21.8 | 31.4 | 3.085 | 60.8 |

Figure 2:
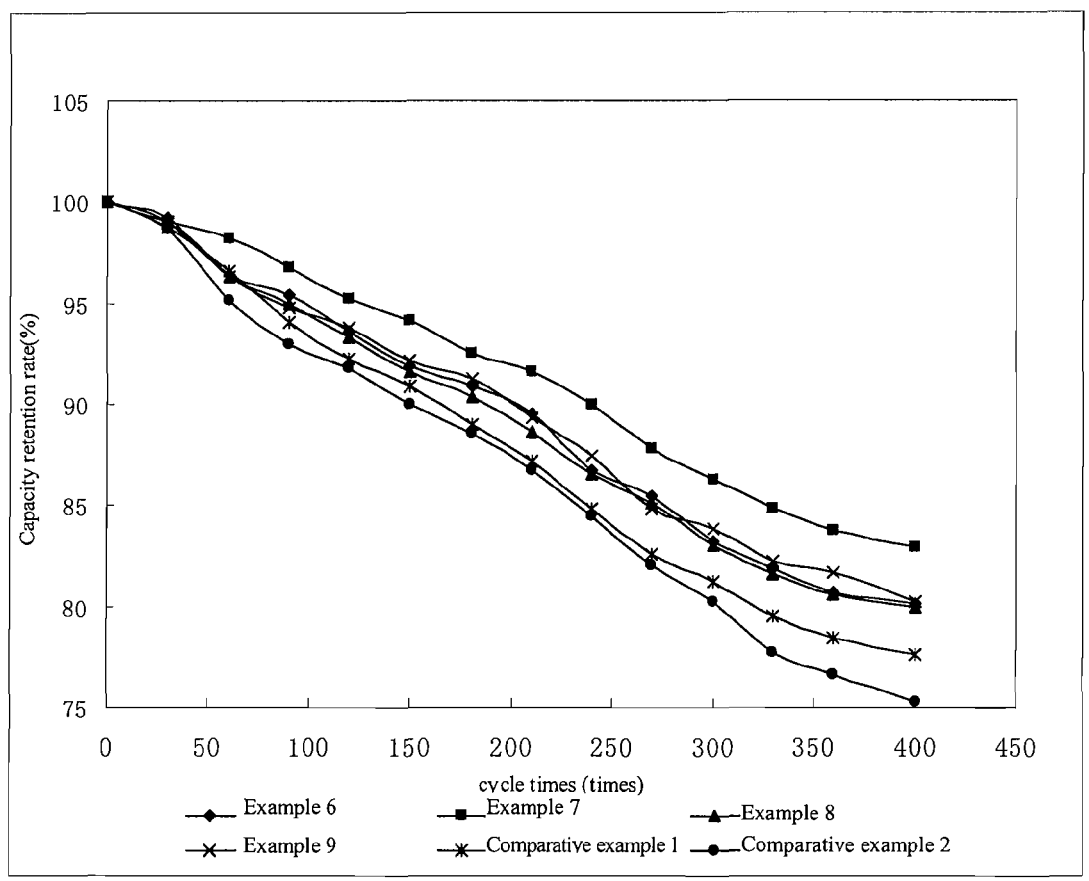
FIG. 2 is the curve shows the relationship between the capacity retention rate (%) and cycle times (times) for lithium ion secondary batteries prepared by examples 6-9 of the present invention and comparative examples 1-2.

(4) Cycle performance test comprises loading the battery on BS-9300 secondary battery performance tester, constant-voltage constant-current charging at IC to 4.2V, standing for 5 min, discharging at 1 C to 3.0V, repeating the cycle for 400 times, recording the capacity retention rate for each cycle to give the curves showing the relationship between capacity retention rate (%) and cycle times (times) as shown in FIG. 1 and FIG. 2, at that time recording thickness $d_0$, $d_1$, $d_2$, $d_3$ and $d_4$ of each part of the battery at initial state, $100^{th}$ cycle, $200^{th}$ cycle, $300^{th}$ cycle, and $400^{th}$ cycle, wherein the upper part refers to position 4 mm away from the battery top, the central part is the most central part of the battery, and the lower part refers to position 4 mm away from the battery bottom. The result is shown in Table 4. In Table 4, $\Delta d_1$, $\Delta d_2$, $\Delta d_3$ and $\Delta d_4$ respectively represents difference value between battery thickness $d_1$ after $100^{th}$ cycle and the initial thickness $d_0$, difference value between battery thickness $d_2$ after $200^{th}$ cycle and the initial thickness $d_0$, difference value between battery thickness $d_3$ after $300^{th}$ cycle and the initial thickness $d_0$, and difference value between battery thickness $d_4$ after $400^{th}$ cycle and the initial thickness $d_0$. The units for $d_0$, $d_1$, $d_2$, $d_3$ and $d_4$ and $\Delta d_1$, $\Delta d_2$, $\Delta d_3$ and $\Delta d_4$ are all millimeter.

TABLE 4

| Electrolyte | Battery | Test part | $d_0$ | $d_1$ | $\Delta d_1$ | $d_2$ | $\Delta d_2$ | $d_3$ | $\Delta d_3$ | $d_4$ | $\Delta d_4$ |
|---|---|---|---|---|---|---|---|---|---|---|---|
| B1 | D1 | Upper part | 4.52 | 4.57 | 0.05 | 4.69 | 0.17 | 4.85 | 0.33 | 4.92 | 0.40 |
| | | Central part | 4.49 | 4.55 | 0.06 | 4.74 | 0.25 | 4.88 | 0.39 | 4.99 | 0.50 |
| | | Lower part | 4.55 | 4.68 | 0.13 | 4.73 | 0.18 | 4.85 | 0.30 | 4.93 | 0.38 |
| B2 | D2 | Upper part | 4.53 | 4.66 | 0.13 | 4.72 | 0.19 | 4.85 | 0.32 | 4.92 | 0.39 |
| | | Central part | 4.48 | 4.69 | 0.22 | 4.85 | 0.37 | 4.92 | 0.44 | 5.02 | 0.55 |
| | | Lower part | 4.66 | 4.74 | 0.08 | 4.82 | 0.16 | 4.85 | 0.19 | 4.94 | 0.28 |
| B3 | D3 | Upper part | 4.51 | 4.55 | 0.04 | 4.70 | 0.19 | 4.83 | 0.32 | 4.90 | 0.39 |
| | | Central part | 4.48 | 4.53 | 0.05 | 4.75 | 0.27 | 4.86 | 0.38 | 4.97 | 0.49 |
| | | Lower part | 4.54 | 4.66 | 0.12 | 4.74 | 0.20 | 4.83 | 0.29 | 4.91 | 0.37 |
| B4 | D4 | Upper part | 4.52 | 4.64 | 0.12 | 4.73 | 0.21 | 4.83 | 0.31 | 4.90 | 0.38 |
| | | Central part | 4.47 | 4.67 | 0.21 | 4.86 | 0.39 | 4.90 | 0.43 | 5.00 | 0.54 |
| | | Lower part | 4.55 | 4.72 | 0.17 | 4.83 | 0.28 | 4.83 | 0.28 | 4.92 | 0.37 |
| B5 | D5 | Upper part | 4.53 | 4.54 | 0.01 | 4.66 | 0.13 | 4.81 | 0.28 | 4.87 | 0.34 |
| | | Central part | 4.50 | 4.52 | 0.02 | 4.71 | 0.21 | 4.84 | 0.34 | 4.94 | 0.44 |
| | | Lower part | 4.56 | 4.65 | 0.09 | 4.70 | 0.14 | 4.81 | 0.25 | 4.88 | 0.32 |
| B6 | D6 | Upper part | 4.54 | 4.63 | 0.09 | 4.69 | 0.15 | 4.81 | 0.27 | 4.87 | 0.33 |
| | | Central part | 4.49 | 4.66 | 0.18 | 4.82 | 0.33 | 4.88 | 0.39 | 4.97 | 0.49 |
| | | Lower part | 4.57 | 4.71 | 0.14 | 4.79 | 0.22 | 4.81 | 0.24 | 4.89 | 0.32 |
| B7 | D7 | Upper part | 4.51 | 4.68 | 0.16 | 4.74 | 0.23 | 4.86 | 0.35 | 4.93 | 0.42 |
| | | Central part | 4.46 | 4.71 | 0.25 | 4.87 | 0.41 | 4.93 | 0.48 | 5.03 | 0.58 |
| | | Lower part | 4.64 | 4.76 | 0.12 | 4.84 | 0.20 | 4.87 | 0.23 | 4.95 | 0.31 |

TABLE 4-continued

| Electrolyte | Battery | Test part | $d_0$ | $d_1$ | $\Delta d_1$ | $d_2$ | $\Delta d_2$ | $d_3$ | $\Delta d_3$ | $d_4$ | $\Delta d_4$ |
|---|---|---|---|---|---|---|---|---|---|---|---|
| B8 | D8 | Upper part | 4.50 | 4.66 | 0.16 | 4.75 | 0.25 | 4.84 | 0.34 | 4.91 | 0.41 |
|  |  | Central part | 4.45 | 4.69 | 0.24 | 4.88 | 0.43 | 4.91 | 0.47 | 5.01 | 0.57 |
|  |  | Lower part | 4.53 | 4.74 | 0.21 | 4.85 | 0.32 | 4.85 | 0.32 | 4.93 | 0.40 |
| B9 | D9 | Upper part | 4.52 | 4.65 | 0.13 | 4.71 | 0.19 | 4.82 | 0.30 | 4.88 | 0.36 |
|  |  | Central part | 4.47 | 4.68 | 0.21 | 4.84 | 0.37 | 4.89 | 0.43 | 4.98 | 0.52 |
|  |  | Lower part | 4.55 | 4.73 | 0.18 | 4.81 | 0.26 | 4.83 | 0.28 | 4.90 | 0.35 |
| CB1 | CD1 | Upper part | 4.62 | 4.76 | 0.14 | 5.08 | 0.46 | 5.16 | 0.54 | 5.17 | 0.55 |
|  |  | Central part | 4.59 | 4.74 | 0.15 | 5.13 | 0.54 | 5.19 | 0.60 | 5.24 | 0.65 |
|  |  | Lower part | 4.65 | 4.87 | 0.22 | 5.12 | 0.47 | 5.16 | 0.51 | 5.18 | 0.53 |
| CB2 | CD2 | Upper part | 4.63 | 4.85 | 0.22 | 5.11 | 0.48 | 5.16 | 0.53 | 5.17 | 0.54 |
|  |  | Central part | 4.58 | 4.88 | 0.31 | 5.24 | 0.66 | 5.23 | 0.65 | 5.27 | 0.70 |
|  |  | Lower part | 4.66 | 4.93 | 0.27 | 5.21 | 0.55 | 5.16 | 0.50 | 5.19 | 0.53 |

It could be seen from Tables 1-4 and FIGS. 1-2, the batteries prepared by the examples of the present invention have desirable overcharge performance, low temperature performance, and cycle performance. The comprehensive result of the battery performance is significantly better than those of batteries prepared by comparative examples 1 and 2.

What the claimed is:

1. An additive mixture for electrolyte of lithium ion secondary battery, wherein the additive mixture comprises biphenyl based compound 0.5-95.4 wt %, cyclohexyl benzene based compound 0.1-93.8 wt %, vinylene carbonate 0.4-93.2 wt %, t-alkyl benzene based compound 0.5-96.5 wt %, and phenyl vinyl sulfone 0.5-95.8% based on the total weight of the additive mixture, wherein the term "biphenyl based compound" refers to a compound comprising a biphenyl group, the term "cyclohexyl benzene based compound" refers to a compound comprising cyclohexyl phenyl group, and "the term t-alkyl benzene based compound" refers to a product resulting from substitution of one or more hydrogen atoms on a benzene ring by a tert-carbon atom-containing linear alkyl group.

2. The additive mixture for the electrolyte of lithium ion secondary battery according to claim 1, wherein the additive mixture comprises biphenyl based compound 3-60 wt %, cyclohexyl benzene based compound 5-50 wt %, vinylene carbonate 5-40 wt %, t-alkyl benzene based compound 10-60 wt %, and phenyl vinyl sulfone 2-40 wt % based on total weight of the additive mixture.

3. The additive mixture for the electrolyte of lithium ion secondary battery according to claim 2, wherein the said biphenyl based compound can be one or more selected from biphenyl, 3-cyclohexyl biphenyl, terphenyl, and derivatives thereof; the said cyclohexylbenzene based compound can be one or more selected from 1,3-dicyclohexyl benzene, cyclohexylbenzene, and derivatives thereof.

4. An electrolyte of lithium ion secondary battery, which comprises an organic solvent, a lithium salt, and an additive, wherein said additive is the additive mixture for electrolyte of lithium ion secondary battery according claim 1.

5. The electrolyte of lithium ion secondary battery according to claim 4, wherein the content of the additive is 1-30 wt %, the content of the organic solvent is 5-15 wt %, and the content of the lithium salt is 65-85 wt % based on the total weight of the electrolyte.

6. The electrolyte of lithium ion secondary battery according to claim 4, wherein the organic solvent is one or more selected from dimethyl carbonate, diethyl carbonate, ethylene carbonate, propylene carbonate, ethyl methyl carbonate, butylenes carbonate, methyl ethylene carbonate, 2-methyl tetrahydrofuran, 1,2-butylene carbonate, methyl propionate, methyl formate, and tetrafuran; the lithium salt can be one or more selected from $LiPF_6$, $LiBF_6$, $LiAsF_6$, $LiClO_4$, $LiCF_3CO_2$, $Li(CF_3CO_2)_2N$, $LiCF_3SO_3$, $Li(CF_3SO_2)_3$, and $Li(CF_3SO_2)_2N$.

* * * * *